US010412259B2

(12) United States Patent
Ito

(10) Patent No.: US 10,412,259 B2
(45) Date of Patent: Sep. 10, 2019

(54) DOCUMENT READING APPARATUS AND IMAGE FORMING APPARATUS

(71) Applicant: KYOCERA Document Solutions Inc., Osaka (JP)

(72) Inventor: Takashi Ito, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/764,787

(22) PCT Filed: Sep. 23, 2016

(86) PCT No.: PCT/JP2016/077921
§ 371 (c)(1),
(2) Date: Mar. 29, 2018

(87) PCT Pub. No.: WO2017/057161
PCT Pub. Date: Apr. 6, 2017

(65) Prior Publication Data
US 2018/0278793 A1    Sep. 27, 2018

(30) Foreign Application Priority Data

Sep. 30, 2015  (JP) ................................ 2015-194079

(51) Int. Cl.
*H04N 1/32*      (2006.01)
*H04N 1/00*      (2006.01)
(Continued)

(52) U.S. Cl.
CPC ....... *H04N 1/32106* (2013.01); *G06F 3/1215* (2013.01); *G06F 3/1222* (2013.01);
(Continued)

(58) Field of Classification Search
CPC .................. H04N 1/32106; H04N 1/00848
See application file for complete search history.

(56) References Cited

U.S. PATENT DOCUMENTS 6,055,530 A  *  4/2000  Sato ................... H04N 1/00127
6,792,547 B1      9/2004  Murata et al.
(Continued)

FOREIGN PATENT DOCUMENTS

CN        1625206 A      6/2005
JP     2001-016383 A     1/2001
(Continued)

OTHER PUBLICATIONS

Japan Patent Office. Office Action of foreign counterpart, dated Apr. 2, 2019.
(Continued)

*Primary Examiner* — King Y Poon
*Assistant Examiner* — Michael L Burleson
(74) *Attorney, Agent, or Firm* — Hawaii Patent Services; Nathaniel K. Fedde; Kenton N. Fedde

(57) ABSTRACT

The amount of time for scanning a document that includes plural pages is shortened and information leakage is prevented.
A file-storage apparatus (12) stores image data of a document that is scanned before as an image file for which access authority is set. A document-feeding unit (3) feeds a document one page at a time from the starting page. A document-reading unit (2) reads that document that is fed by the document-feeding unit (3), and converts the document to image data. A file-search unit (111) that, when a specified number of pages from the start of a document is read by the document-reading unit (2) according to an instruction from a user, searches, based on respective image data of the specified number of pages at the start that are read and access authority, for an image file from the file-storage apparatus (12) that is accessible by the user and that corresponds to the document as a corresponding image file. A liquid-crystal-display unit of an operation unit (5) as a
(Continued)

notification unit notifies the user of a corresponding image file that is found by the file-search unit (111).

15 Claims, 7 Drawing Sheets

(51) Int. Cl.
*H04N 1/21* (2006.01)
*H04N 1/44* (2006.01)
*G06F 16/51* (2019.01)
*G06F 16/25* (2019.01)
*G06F 3/12* (2006.01)
*G06F 16/00* (2019.01)

(52) U.S. Cl.
CPC ............ *G06F 3/1238* (2013.01); *G06F 16/00* (2019.01); *G06F 16/258* (2019.01); *G06F 16/51* (2019.01); *H04N 1/00* (2013.01); *H04N 1/0009* (2013.01); *H04N 1/00209* (2013.01); *H04N 1/00925* (2013.01); *H04N 1/21* (2013.01); *H04N 1/444* (2013.01); *H04N 2201/0081* (2013.01); *H04N 2201/3246* (2013.01)

(56) References Cited

U.S. PATENT DOCUMENTS

| | | | |
|---|---|---|---|
| 2005/0111052 | A1 | 5/2005 | Nishikawa et al. |
| 2008/0162474 | A1 | 7/2008 | Thong et al. |
| 2010/0079802 | A1* | 4/2010 | Kanai .................... G06F 3/1205 358/1.15 |
| 2011/0067090 | A1* | 3/2011 | Osaki .................... G06F 21/608 726/4 |
| 2014/0029032 | A1 | 1/2014 | Hilbert et al. |
| 2015/0092252 | A1 | 4/2015 | Kwak et al. |
| 2016/0182747 | A1* | 6/2016 | Zahoran ............. H04N 1/00408 358/474 |

FOREIGN PATENT DOCUMENTS

| | | |
|---|---|---|
| JP | 2005-157450 A | 6/2005 |
| JP | 2007-011578 A | 1/2007 |

OTHER PUBLICATIONS

European Patent Office. Extended European Search Report of foreign counterpart, dated Apr. 8, 2019.

China National Intellectual Property Administration. Office Action of foreign counterpart, dated Feb. 2, 2019.

* cited by examiner

FIG. 3

| IMAGE FILE | ACCESS AUTHORITY |
|---|---|
| DOCUMENT AAA | USER A |
| DOCUMENT BBB | GROUP B |
| DOCUMENT CCC | ALL |

12

DOCUMENT READING APPARATUS AND IMAGE FORMING APPARATUS

TECHNICAL FIELD

The present invention relates to a document reading apparatus and an image forming apparatus that read a document such as a book that includes multiple pages, and create an image file.

BACKGROUND ART

Scanning a document that covers multiple pages such as a book and the like takes time. Therefore, technology is proposed in which a database that stores image files of scanned documents is provided, and when a document is scanned, the database is search for an image file of the scanned document, and when the image file is found, the image file that is stored in the database is used (for example, refer to Patent Literature 1).

PRIOR ART LITERATURE

Patent Literature

Patent Document 1: JP2007011578 (A)

SUMMARY OF INVENTION

Problems to Be Solved by Invention

However, in the technology according to Patent Literature 1, anyone is able to reference the image files that are stored in the database, so there is a problem in that there is possibility that information may be leaked.

Taking into consideration the problems above, the object of the present invention is to provide technology that, together with being able to reduce the scanning time for scanning a document that includes multiple pages, is able to prevent leakage of information.

Means for Solving Problems

The document reading apparatus of the present invention is characterized by including: a document-feeding unit that feeds a document one page at a time from the starting page; a document-reading unit that reads the document that is fed by the document-feeding unit, and converts the document to image data; a file-storage apparatus that stores the image data as an image file for which access authority is set; a file-search unit that, when a specified number of pages at the start of the document are read by the document-reading unit according to an instruction from a user, searches from the file-storage apparatus for an image file that corresponds to the document and that is accessible by the user as a corresponding image file; and a notification unit that notifies of the corresponding image file that is found by the file-search unit.

Effect of Invention

With the present invention it is possible to provide technology that shortens the amount of time for scanning a document that includes plural pages, and prevents information leakage.

BRIEF DESCRIPTION OF DRAWINGS

FIG. 3 is an example of stored image files in the file storage apparatus illustrated in FIG. 2.

EMBODIMENTS FOR CARRYING OUT INVENTION

In the following, embodiments according to the present invention will be explained in detail with reference to the drawings. In the embodiments below, the same reference numbers will be given to configuration that exhibits the same function.

Figure 1:
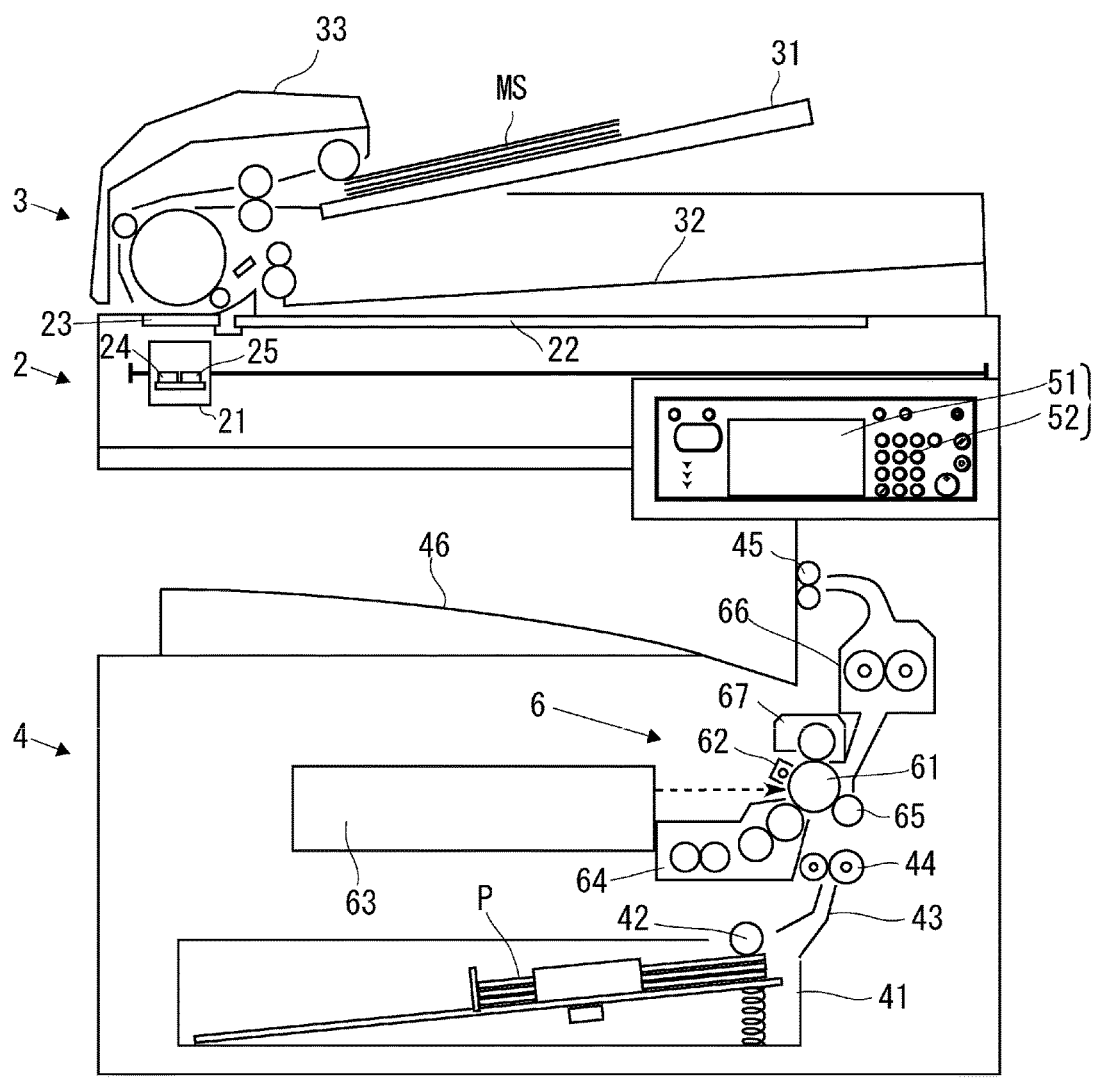
FIG. 1 is a cross-sectional view of an image forming apparatus according to an embodiment of the present invention.

The image forming apparatus 1 according to this embodiment is a MFP that has a scanning function, and functions as a document reading apparatus. In reference to FIG. 1, the image forming apparatus includes a document-reading unit 2, a document-feeding unit 3, a main unit 4, and an operation unit 5. The document-reading unit 2 is arranged on top of the main unit 4, and the document-feeding unit 3 is arranged on top of the document-reading unit 2. Moreover, the operation unit 5 that performs settings and operating instructions of image forming apparatus 1 is arranged on the front side of the image forming apparatus 1.

The operation unit 5 is provided with a liquid-crystal-display unit 51 and operation buttons 52. By operating the operation unit 5 and inputting instructions, a user performs various settings of the image forming apparatus 1, and executes various functions such as image formation and the like. The liquid-crystal-display unit 51 indicates the state of the image forming apparatus, displays the image-forming status and the number of copies being printed, and as a touch panel, receives instructions for various functions such as double-sided printing, black-and-white reversal, and the like, and various settings such as a magnification setting, density setting and the like. As the operation buttons 52, a start button that the user uses to give an instruction to start image formation, a stop/cancel button that is used for interrupting image formation, a reset button that is used when setting the various settings of the image forming apparatus 1 to the default state, a numeric keypad and the like are provided.

The document-reading unit 2 includes a scanner 21, a platen glass 22, and a document-reading slit 23. The scanner 21 includes a light source 24 that uses a LED (Light Emitting Diode), and a light-receiving unit 25 that includes a CCD (Charge Coupled Device) line sensor, CMOS (Complementary Metal Oxide Semiconductor) line sensor and the like, and is configured to be able to move in a conveying direction of a document MS by the document-feeding unit 3. The document-reading slit 23 is a slit that is formed in a direction that orthogonally crosses the conveying direction of the document MS by the document-feeding unit 3.

The document-feeding unit 3 includes a document-placement unit 31, a document-discharge unit 32, and a document-conveying mechanism 33. A document MS that is set on the document-placement unit 31 is fed in order one page at a time and conveyed by the document-conveying mechanism 33 to a position facing the document-reading slit 23, and after that is discharged to the document-discharge unit 32. Moreover, the document-feeding unite 3 and the document-reading unit 2 are connected on the rear side of the image forming apparatus 1 by a hinge mechanism, and the document-feeding unit 3 functions as a platen cover that opens or closes the top surface of the platen glass 22. By opening the document-feeding unit 3 upward, the top surface of the platen glass 22 is opened, and is in a state in which a document MS can be set on the platen glass 22.

When an instruction to read a document MS is given using the operation buttons 52 of the operation unit 5 in a state in which there is no document MS set on the document-placement unit 31, or in a state in which the document-feeding unit 3 (platen cover) is open, a document MS that is set on the platen glass 22 will be read. When reading a document MS placed on the platen glass 22, the scanner 21 moves to a position facing the platen glass 22 and acquires image data by reading while scanning the document MS that is set on the platen glass 22 from a sub-scanning direction reference line in a sub-scanning direction that is orthogonal to a main scanning direction, and outputs the acquired image data to the main unit 4.

When an instruction to read a document MS is given by using the operation buttons 52 of the operation unit 5 in a state in which a document MS is set on the document-placement unit 31, a document MS that is conveyed by the document-feeding unit 3 is read. The document MS is set on the document-placement unit 31 with the front surface (surface from which a document image will be read) facing upward. Then, the document MS that is set on the document-placement unit 31 is conveyed from the left side by the document-feeding unit 3, and guided to a position where the surface of the document MS faces the document-reading slit 23. Moreover, when reading a document MS that is conveyed by the document-feeding unit 3, the scanner 21 moves to a position that faces the document-reading slit 23, and through the document-reading slit 23, acquires image data by reading the document MS in synchronization with the conveying operation by the document-feeding unit 3, and outputs the acquired image data to the main unit 4.

The main unit 4, together with including a printing unit 6, includes a paper-supply unit 41, a paper-supply roller 42, a paper-conveying path 43, a conveying roller 44, and a discharge roller 45. The paper-supply unit 41 is a paper-supply cassette in which plural sheets of printing paper P are stored, and the paper-supply roller 42 outputs printing paper P one sheet at a time from the paper-supply unit 41 to the paper-conveying path 43. Printing paper P that is outputted to the paper-conveying path 43 by the paper-supply roller 42 is conveyed to the printing unit 6 by the conveying roller 44. Then, the printing paper P that has been printed on by the printing unit 6 is discharged, by the discharge roller 45, to a discharge space 46 that is formed between the document-reading unit 2 and the main unit 4. In this way, the paper-supply roller 42, the conveying roller 44 and the discharge roller 45 function as a conveying unit for printing paper P.

The printing unit 6 includes a photosensitive drum 61, a charging unit 62, an exposing unit 63, an image-forming unit 64, a transfer unit 65, a fixing unit 66, and a cleaning unit 67. The exposing unit 63 is an optical unit that includes a laser apparatus, mirrors and the like, and exposes the photosensitive drum 61 that is uniformly charge by the charging unit 62 by outputting laser light to the photosensitive drum 61 based on image data, and forms an electrostatic latent image on the photosensitive drum 61. The image-forming unit 64 is a developing unit that uses toner to develop the electrostatic latent image that is formed on the photosensitive drum 61, and causes a toner image to be formed on the photosensitive drum 61 based on the electrostatic latent image. The transfer unit 65 causes the toner image that is formed on the photosensitive drum 61 by the image-forming unit 64 to be transferred to printing paper P. The fixing unit 66 heats the printing paper P to which the toner image is transferred by the transfer unit 65, and fixes the toner image to the printing paper P. Then, the toner that remains on the photosensitive drum 61 is removed by the cleaning unit 67.

Figure 2:
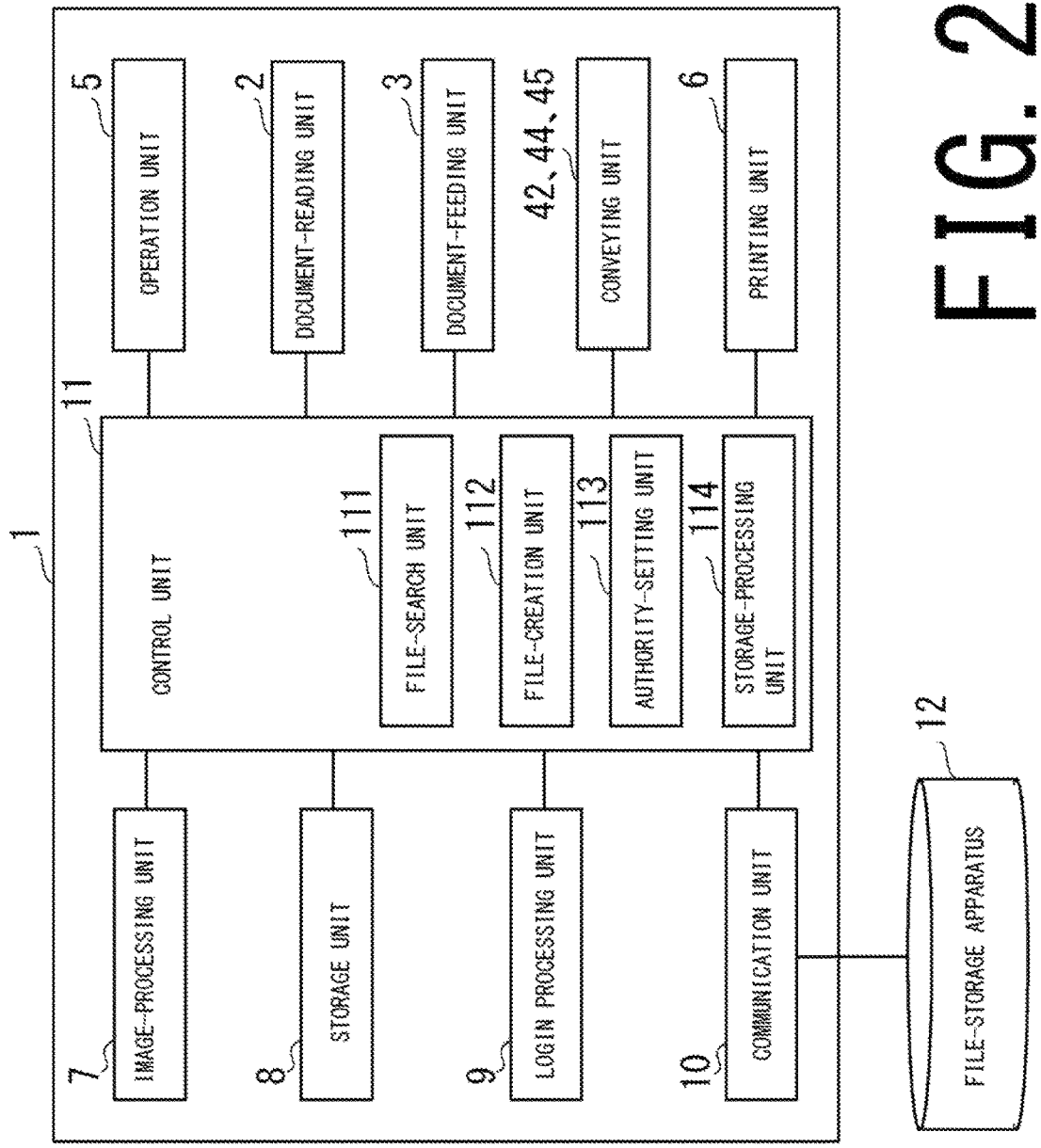
FIG. 2 is a functional block diagram illustrating an overview of the image forming apparatus illustrated in FIG. 1.

FIG. 2 is a block diagram illustrating an overview of the configuration of the image forming apparatus 1. The document-reading unit 2, the document-feeding unit 3, the conveying unit (paper-supply roller 42, the conveying roller 44, the discharge roller 45), the operation unit 5 and the printing unit 6 are connected to a control unit 11, and the respective operation of each is controlled by the control unit 11. Moreover, an image-processing unit 7, a storage unit 8, a login-processing unit 9 and a communication unit 10 are connected to the control unit 11.

The image-processing unit 7 is a device that performs specified image processing on image data, and for example, performs a rotation process, an enlargement or reduction process, and an image-improvement process such as tone adjustment, density adjustment and the like.

The storage unit 8 is a storage device such as a semiconductor memory, a HDD (Hard Disk Drive) or the like, and together with storing image data that is acquired by the document-reading unit 2 reading a document MS, stores various kinds of management information.

The login-processing unit 9 and has the function of performing user login authentication using pre-stored user information (not illustrated in the figure), and allowing login to the image forming apparatus 1 of a user for which authentication is successful.

The communication unit 10 has a function of transmitting or receiving various kinds of data to and from a file-storage apparatus 12 via a network such as a LAN or the like. The communication unit 10 may also have a function of connecting to the Internet, and may transmit or receive various kinds of data to and from the file-storage apparatus 12 via the Internet.

The file-storage apparatus 12 is a storage device that stores image files (one digitized file is configured in pages having a plurality of image data) that are transmitted via the communication unit 10. In this embodiment, a file-storage apparatus 12 that is provided on a network is explained as an example; however, the file-storage apparatus 12 may be installed inside the image forming apparatus 1, or may be provided on the cloud.

FIG. 3 is an example of storing an image file in the file-storage apparatus 12. An "image file" and "access authority" that is set for the image file are correlated and stored in the file-storage apparatus 12.

For example, in the file-storage apparatus 12, image file "Document AAA" is accessible by only "User A", image file "Document BBB" is only accessible by users belonging to "Group B", and image file "Document CCC" is accessible by "All" users.

The control unit 11 is an information-processing unit such as a microcomputer or the like that includes a ROM (Read Only Memory), a RAM (Random Access Memory) and the like. The ROM stores a control program for performing operation control of the image forming apparatus 1. By reading the control program that is stored in the ROM and expanding that control program in the RAM, the control unit 11 performs overall control of the image forming apparatus according to specified instruction information that is inputted from the operation unit 5.

Moreover, the control unit 11 functions as a file-search unit 111, a file-creation unit 112, an authority-setting unit 113, and a storage-processing unit 114.

The file-search unit 111 has a function of, based on access authority that is set for respective image data that is first read via the document-reading unit 2 and image files that are stored in the file-storage apparatus 12, searching whether there are any image files stored in the file-storage apparatus 12 corresponding to a document MS that are accessible by a user that has logged in via the login-processing unit 9 (logged-in user).

The file-creation unit 112 has a function of creating an image file that is configured into pages having a plurality of image data.

The authority-setting unit 113 has a function of receiving settings for access authority via the operation unit 5, and setting access authority for image files. Access authority is a setting that specifies users that can access an image file, and there are three settings; "permission for self only", "permission for a group", and "permission for all". When "permission for self only" is set, an image file is accessible by only the user that created the image file. When "permission for a group" is set, the image file is accessible by members of a group to which the creating user belongs. When "permission for all" is set, there are no restrictions on users that can access the image file, and the image file can be accessed by anyone.

The storage-processing unit 114 has the function of storing image files for which access authority is set in the file-storage apparatus 12.

Figure 4:
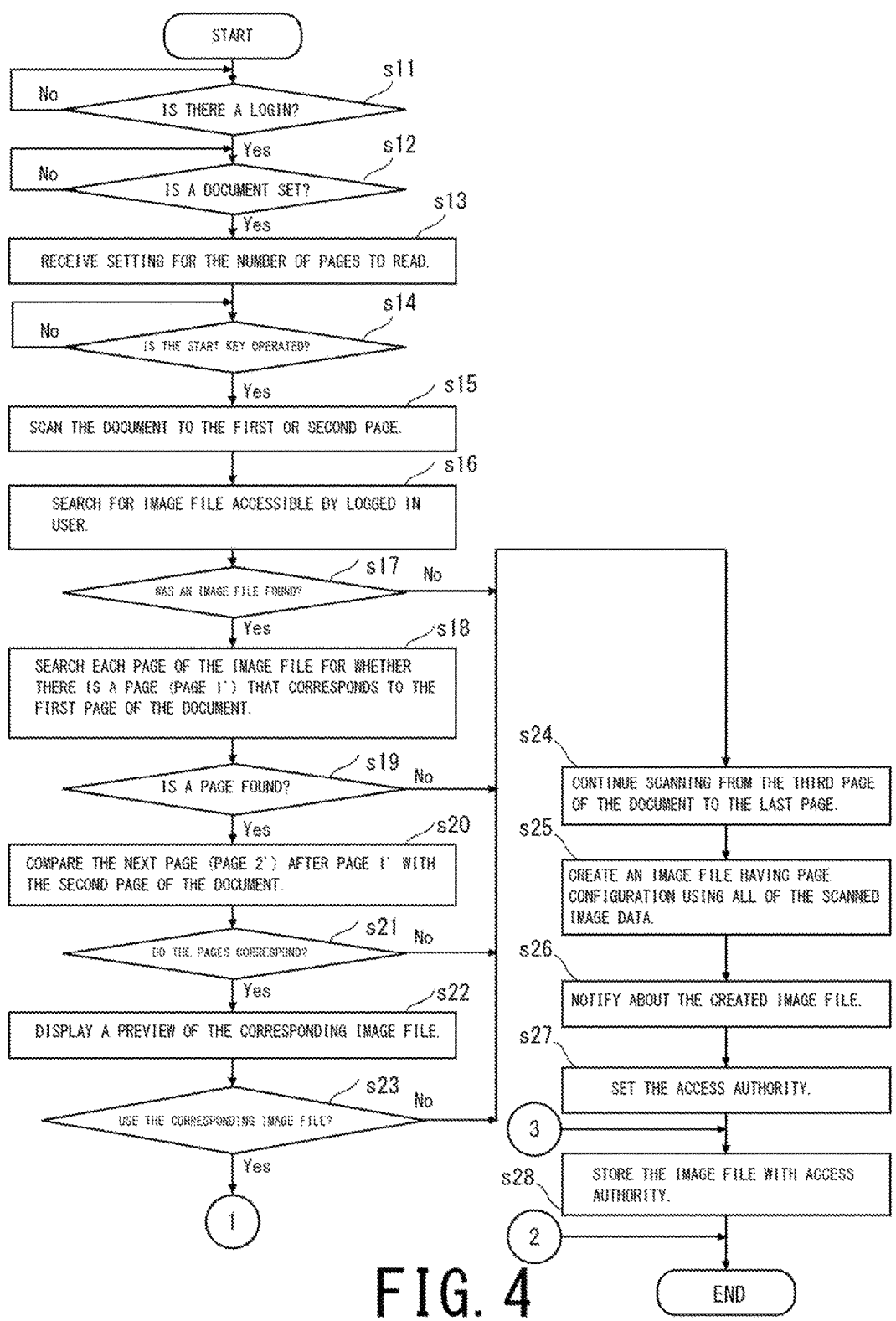
FIG. 4 is a flowchart illustrating the document reading operation of the image forming apparatus illustrated in FIG. 2.
Figure 5:
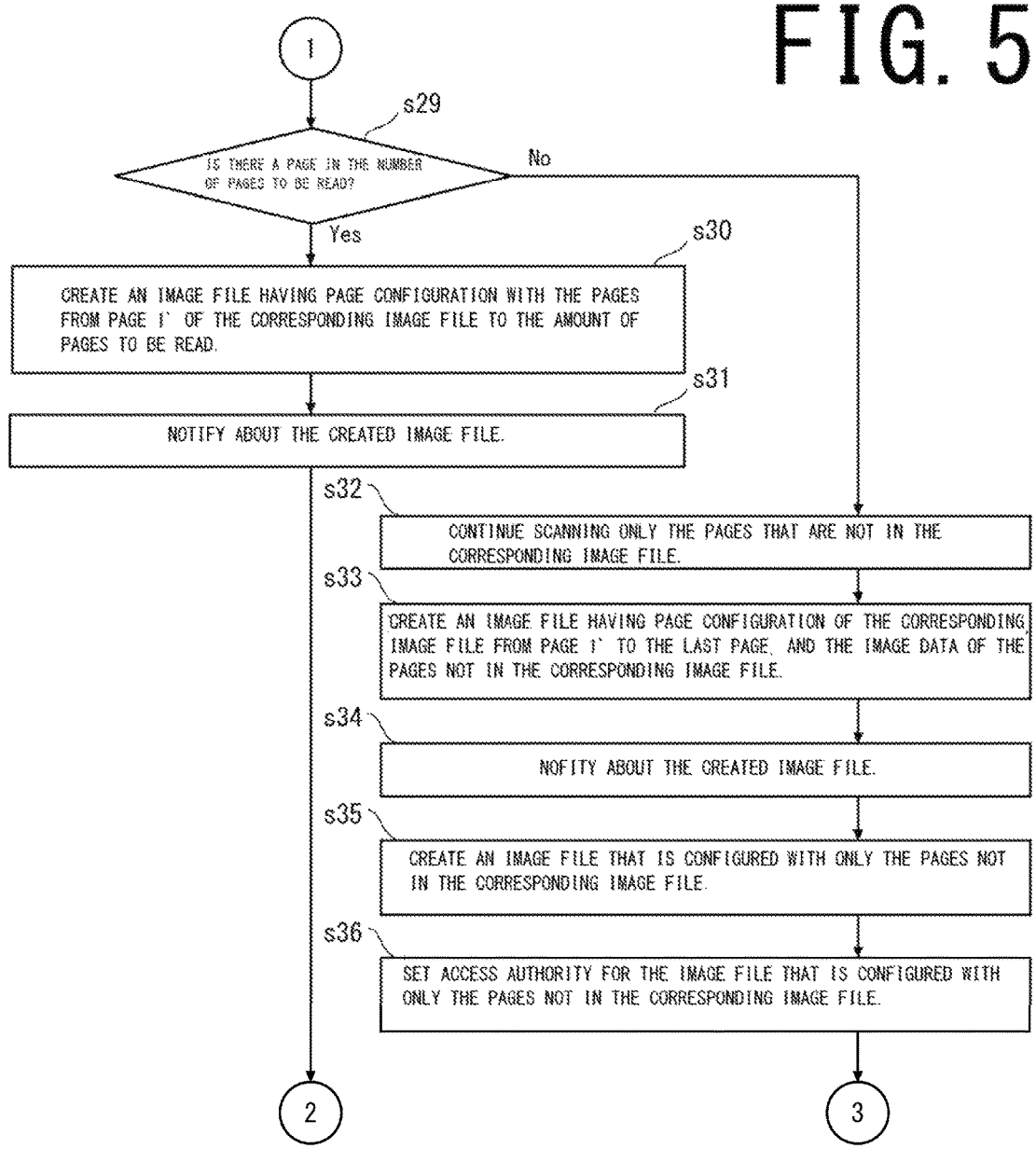
FIG. 5 is a continuation of the flowchart illustrated in FIG. 4.

Next, the image-reading operation by the image forming apparatus 1 will be explained in detail with reference to FIG. 4 and FIG. 5. Here, an example is explained for a case in which user A that belongs to group A is performing a scan of a book. The book is cut and set in the document-placement unit 31 as a document MS.

The login-processing unit 9 waits until a user logs in (step s11, step s11: NO). When user A inputs identification information for user A via the operation unit 5, the login-processing unit 9 executes user authentication, and compares the inputted identification information with pre-stored user information, and when there is a match, allows user A to login to the image forming apparatus 1 (step s11: YES).

Figure 6:
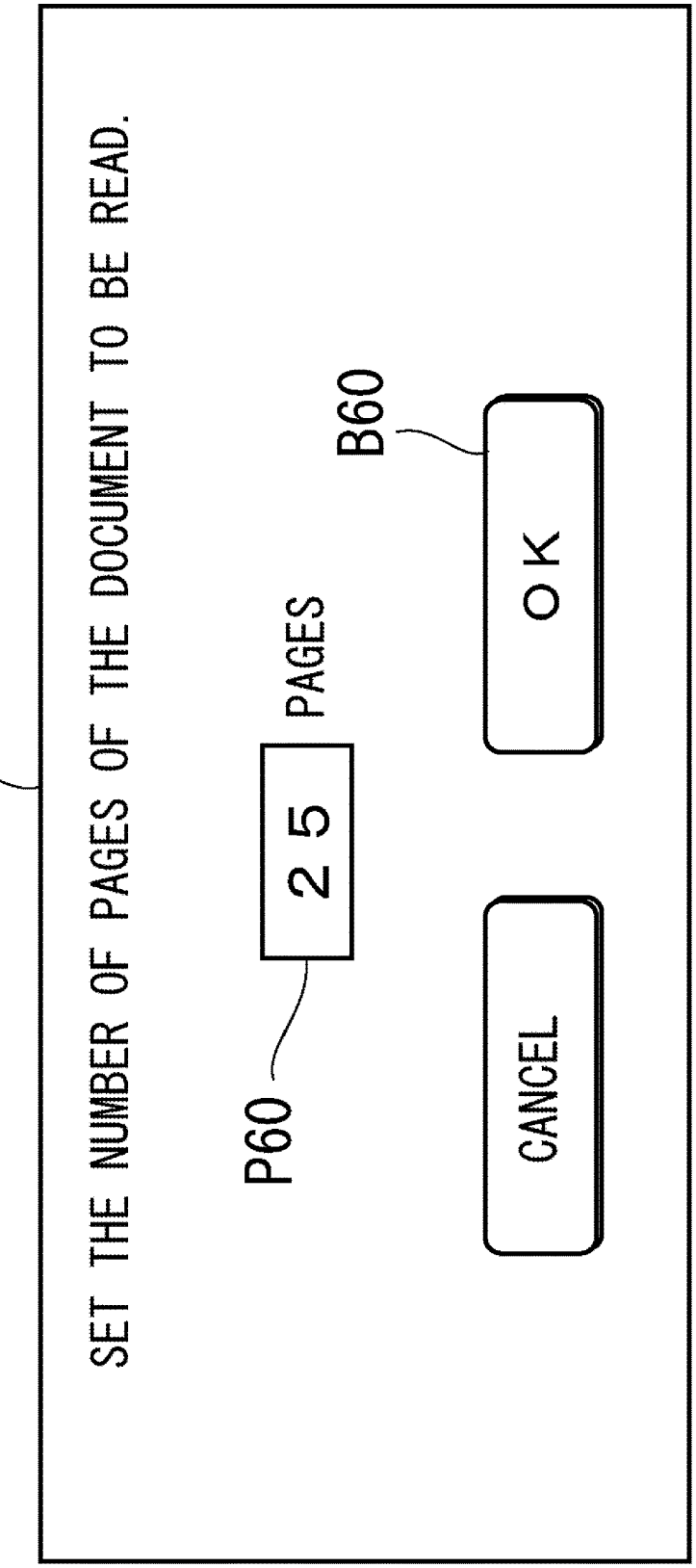
FIG. 6 is an example of a display of a document-reading-page-number-setting screen that is displayed on the operation unit illustrated in FIG. 2.

After user A logs in (step s11: YES), the control unit 11 waits until a document MS is set in the document-placement unit 31 (step s12, step s12: NO). When a document MS is set (step s12: YES), the control unit 11 causes the page-number-setting screen G60 illustrated in FIG. 6 to be displayed on the liquid-crystal display 51, and receives a setting for the number of pages P60 of the document MS to be read (step s13). In this case, the control unit 11 functions as a page-number-setting unit. On the page-number-setting screen G60, it is possible to set the number of pages P60 to read of the document MS being scanned. After the number of pages P60 to read is set, the control unit 11 waits until the start button is operated (step s14, step s14: NO).

When the start button is operated (step s14: YES), the control unit 11 causes the document-reading unit 2 to scan the starting pages (for example, pages 1 to 2 at the start) of the document MS (step s15).

Continuing, the control unit 11 functions as a file-search unit 111, and searches for image files from the image files that are stored in the file-storage apparatus 12 that are accessible by user A (step s16). Referring to the file-storage apparatus 12 illustrated in FIG. 3, document AAA and document CCC are set as image files that are accessible by user A.

As a result of the search, when an image file is found that is accessible by user A (step s17: YES), the file-search unit 111 searches each page of the image files that are accessible by user A for whether there is a page (1' page) that corresponds to the first page of the scanned document MS (step s18).

In this embodiment, a page of an image file that corresponds to a page of a document MS may be a page in the case when image data of the pages match when comparing pages (for example, a matching rate of 95 to 100%), or may be a page in the case when image data of the pages are similar (for example, a matching rate of 70 to 95%) when comparing pages. Moreover, when determining whether image data matches, known technology may be used; for example, the file-search unit 111 may extract characteristic points of the respective image data, and determine whether or not the characteristic points match. Furthermore, when comparing pages, instead of comparing image data, the file-search unit 11 may perform an OCR (Optical Character Reader) process on the respective image data, and acquire text data of the pages, then compare the text data of the pages.

When as a result of a search, an image file having page 1' is found (step s19: YES), the file-search unit 111 compares the next page after the page 1' of the image file (page 2') with the second page of the document MS (step s20), and determines whether or not the pages correspond (step s21). In doing so, the page order of an image file and the page order of the document MS are checked for whether or not the orders are the same.

When page 2' of the image file does not correspond with the second page of the document MS (step s21: NO), processing advances to step s24. When a plurality of image files that are accessible by user A are found, the process from step s18 to step s21 is repeated for each respective image file of the plurality of image files.

When the page following page 1' of the image file (page 2') corresponds with the second page of the document MS (step s21: YES), the file-search unit 111 causes the preview screen G70 illustrated in FIG. 7 to be displayed on the liquid-crystal display unit 51 (step s22).

Figure 7:
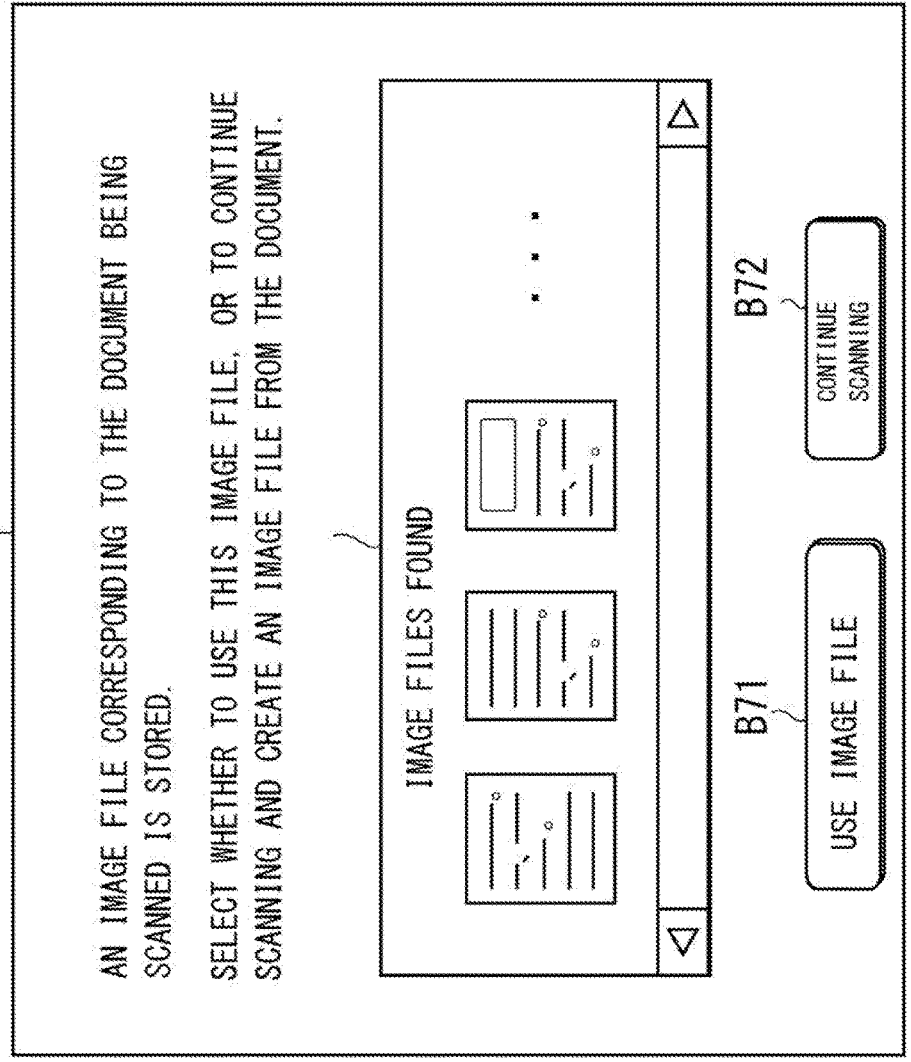
FIG. 7 is an example of a display of a preview screen that is displayed on the operation unit illustrated in FIG. 2.

FIG. 7 is a display example of the preview screen G70. Here, the liquid-crystal display unit 51 functions as a notification unit, and via the preview screen G70 notifies of the contents of the image file having page 1' and page 2' (corresponding image files). Moreover, a "Use image file" button B71, and "Continue scanning" button B72 are provided on the preview screen G70. When the "Use image file" button B71 is operated, the control unit 11 interrupts the scan of the document MS, and allows the user A to use this image file. Therefore, it is possible for user A to save time and effort required to scan the entire document MS. When the "Continue scanning" button B72 is operated, the control unit 11 continues scanning the document MS, and creates an image file based on the document MS. The user A, via the preview screen G70, checks whether the corresponding image file is the same document as the document MS, and can select whether to use the corresponding image file that was found from the file-storage apparatus 12, or use the image file that is created by continuing the scan of the document MS.

When the "Use image file" button B71 is not operated, in other words, when the "Continue scanning" button B72 is operated, or when an image file that is accessible by user A or an image file that has page 1' is not found (step s19: NO, step s21: NO, step s23: NO), the control unit 11 continues scanning from page 3' to the last page of the document MS via the document-reading unit 2 (step s24). Next, the control unit 11 functions as a file-creation unit 112 and creates an image file that includes all of the image data that is scanned and acquired from the document MS in page configuration (step s25), and via the liquid-crystal display unit 51, notifies user A about the created image file (step s26). As a result, user A is able to use the image file of the document MS by printing or transmitting the image file.

Together with that, the control unit 11 functions as an authority-setting unit 113, and receives a setting for access authority via the operation unit 5, and sets access authority for the created image file (step s27). Next, the control unit 111 functions as a storage-processing unit 114, and stores the image file for which access authority has been set in the file-storage apparatus 12 (step s28), and this process then ends. As a result, user A is able to allow users that correspond to the access authority to use the image file that is created by scanning the document MS.

On the other hand, when the "Use image file" button B71 is operated via the preview screen G70 (step s23: YES), the file-search unit 111 determines whether there are pages in the corresponding image file up to the number of pages P60 read from page 1' (step s29). There are cases when a stored image file does not include all of the pages of a book and includes only part, and this is because there are cases when there are no pages corresponding to the document MS of user A.

When there are pages for the number of pages read from page 1' of the corresponding image file (step s29: YES), the file-creation unit 112, based on the corresponding image file, creates an image file that includes up to the number of pages read from page 1' (step s30). Then, the file-creation unit 112 notifies and allows user A to use the created image file (step s31), and this process ends. In this case, in order to prevent duplication, the created image file is not stored in the file-storage apparatus 12. By not allowing duplication of image data stored in the file-storage apparatus 12, it is possible to shorten the search time for searching the file-storage apparatus 12.

On the other hand, when there are no pages for the number of pages read from page 1' of the corresponding image file (step s29: NO), the control unit 11, via the document-reading unit 2, continues scanning the document MS by only the amount of pages not in the corresponding image file (step s32). Therefore, not all of the pages of the document MS are scanned, so it is possible to shorten the scanning time and save time and effort for scanning. In this case, the control unit 11, via the document-reading unit 2 and document-feeding unit 3, starts reading the document MS after the starting page of the pages not included in the corresponding image file comes.

Continuing, the file-creation unit 112 creates an image file that includes from page 1' to the last page of the corresponding image file that is found by searching, and image data of the amount of pages not in the corresponding image file that is acquired by scanning (step s33). Next, the file-creation unit 112, via the liquid-crystal display unit 51, notifies and allows user A to use the created image file (step s34).

Together with that, the file-creation unit 112 creates an image file that has page configuration of only the image data that is included in the amount of pages not included in the corresponding image file (step s35). Then, the authority-setting unit 113, via the operation unit 5, receives a setting for the access authority, and sets the access authority for the created image file (step s36). Next, the storage-processing unit 114 stores the image file with access authority in the file-storage apparatus 12 (step s28), and this processing ends. As a result, an image file having page configuration with only image data that was not stored in the file-storage apparatus 12 is stored in the file-storage apparatus 12.

In this way, the image forming apparatus 1 according to this embodiment includes a document-feeding unit 3 that feeds a document MS one page at a time from the starting page, a document-reading unit 2 that reads the document that is fed by the document-feeding unit 3 and converts the document MS to image data, a file-storage apparatus 12 that stores the image data as an image file for which access authority is set, a file-search unit 111 that, when a specified number of pages at the start of a document MS is read by the document-reading unit 2 according to an instruction for a user, and based on the specified number of starting pages read and the respective image data and access authority, searches for an image file as a corresponding image file from the file-storage apparatus 12 that corresponds to the document MS and that is accessible by the user, and a notification unit (liquid-crystal display unit 51) that notifies of a corresponding image file that is found by file-search unit 111.

As a result, when scanning a document MS such as a book that includes plural pages, by simply scanning a specified number of pages at the start, whether there are any image files that correspond to the document MS is searched for among the image files stored in the file-storage apparatus 12 that are accessible by the user giving the scanning instruction.

Therefore, the image files that are the object of a search are limited to image files that are accessible by a logged in user, so there is no risk of information leakage. Moreover, image files corresponding to the document MS are search for from the file-storage apparatus 12 based on the first number of pages that are read from the document MS, so it is possible to save time and effort for scanning.

The present invention is not limited to the embodiment described above, and needless to say various modifications are possible within a range that does not depart from the scope of the present invention.

What is claimed is:

1. A document reading apparatus, comprising:
   a document-feeding unit that feeds a document one page at a time from the starting page;
   a document-reading unit that reads the document that is fed by the document-feeding unit, and converts the document to image data;
   a file-storage apparatus that stores the image data as an image file for which access authority is set;
   a file-search unit that, when a specified number of pages at the start of the document are read by the document-reading unit according to an instruction from a user, searches from the file-storage apparatus for an image file that corresponds to the document and that is accessible by the user as a corresponding image file, wherein the file-search unit determines that the image file corresponds to the document by a process comprising comparing a first page read of the document with a first page of the image file, and determining a matching rate between the first page read of the document and first page of the image file; and a notification unit that notifies of the corresponding image file that is found by the file-search unit.

2. The document reading apparatus according to claim 1 wherein the notification unit displays a preview of the corresponding image file that is found by the file-search unit.

3. An image forming apparatus that comprises the document reading apparatus according to claim 1.

4. The document reading apparatus according to claim 1, wherein said comparing of the first page read of the document with the first page of the image file, comprises comparing Optical Character Reader ('OCR')-recognized text of the first page read of the document with OCR-recognized text of the first page of the image file.

5. The document reading apparatus according to claim 1, wherein said determining that the image file corresponds to the document further comprises comparing a second page read of the document with a second page of the image file, and determining a matching rate between the second page read of the document and second page of the image file;

the first and second pages read of the document are present in the document as pages sequential to each other; and the first and second pages of the image file are present in the image file as pages sequential to each other.

6. The document reading apparatus according to claim 5, wherein said comparing of the second page read of the document with the second page of the image file comprises comparing OCR-recognized text of the second page read of the document with OCR-recognized text of the second page of the image file.

7. A document reading apparatus, comprising:

a document-feeding unit that feeds a document one page at a time from the starting page;

a document-reading unit that reads the document that is fed by the document-feeding unit, and converts the document to image data;

a file-storage apparatus that stores the image data as an image file for which access authority is set;

a file-search unit that, when a specified number of pages at the start of the document are read by the document-reading unit according to an instruction from a user, searches from the file-storage apparatus for an image file that corresponds to the document and that is accessible by the user as a corresponding image file, wherein the file-search unit determines that the image file corresponds to the document by a process comprising comparing a first page read of the document with a first page of the image file, and determining a matching rate between the first page read of the document and first page of the image file;

a notification unit that notifies of the corresponding image file that is found by the file-search unit; and an operation unit that allows the user to select between use of the corresponding image file that is found by the file-search unit, and use of an image file that is created by continuing to read the document.

8. The document reading apparatus according to claim 7, wherein said comparing of the first page read of the document with the first page of the image file, comprises comparing Optical Character Reader ('OCR')-recognized text of the first page read of the document with OCR-recognized text of the first page of the image file.

9. The document reading apparatus according to claim 7, wherein said determining that the image file corresponds to the document further comprises comparing a second page read of the document with a second page of the image file, and determining a matching rate between the second page read of the document and second page of the image file;

the first and second pages read of the document are present in the document as pages sequential to each other; and the first and second pages of the image file are present in the image file as pages sequential to each other.

10. The document reading apparatus according to claim 9, wherein said comparing of the second page read of the document with the second page of the image file comprises comparing OCR-recognized text of the second page read of the document with OCR-recognized text of the second page of the image file.

11. A document reading apparatus, comprising:

a document-feeding unit that feeds a document one page at a time from the starting page;

a document-reading unit that reads the document that is fed by the document-feeding unit, and converts the document to image data;

a file-storage apparatus that stores the image data as an image file for which access authority is set;

a file-search unit that, when a specified number of pages at the start of the document are read by the document-reading unit according to an instruction from a user, searches from the file-storage apparatus for an image file that corresponds to the document and that is accessible by the user as a corresponding image file, wherein the file-search unit determines that the image file corresponds to the document by a process comprising comparing a first page read of the document with a first page of the image file, and determining a matching rate between the first page read of the document and first page of the image file;

a notification unit that notifies of the corresponding image file that is found by the file-search unit;

a page-number-setting unit that receives a setting for a number of pages of the document to be read; and a file-creation unit that creates the image file of the document that is converted to the image file; wherein the document reading unit continues reading the amount of pages that are not in the corresponding image file of the document and converts the read pages to the image data; and the file-creation unit creates an image file that is configured in pages and includes pages in the corresponding image file from a page that corresponds to the first page of the document up to the number of pages to be read, and image data of the pages that are not in the corresponding image file that is converted by the document-reading unit.

12. The document reading apparatus according to claim 11, wherein the file-creation unit creates an image file that is configured in pages and includes only image data of the pages that are not in the corresponding image file that is converted by the document-reading unit, and comprises a storage-processing unit that stores the image file for the pages that are not in the corresponding image file that is created by the file-creation unit in the file-storage apparatus.

13. The document reading apparatus according to claim 11, wherein said comparing of the first page read of the document with the first page of the image file, comprises comparing Optical Character Reader ('OCR')-recognized text of the first page read of the document with OCR-recognized text of the first page of the image file.

14. The document reading apparatus according to claim 11, wherein said determining that the image file corresponds to the document further comprises comparing a second page read of the document with a second page of the image file, and determining a matching rate between the second page read of the document and second page of the image file;

the first and second pages read of the document are present in the document as pages sequential to each other; and the first and second pages of the image file are present in the image file as pages sequential to each other.

15. The document reading apparatus according to claim 14, wherein said comparing of the second page read of the document with the second page of the image file comprises comparing OCR-recognized text of the second page read of the document with OCR-recognized text of the second page of the image file.

* * * * *